Patented Nov. 8, 1932

1,886,480

UNITED STATES PATENT OFFICE

ROBERT HALLER, OF RIEHEN, NEAR BASEL, AND ALPHONSE HECKENDORN, OF BASEL, SWITZERLAND, ASSIGNORS TO SOCIETY OF CHEMICAL INDUSTRY IN BASLE, OF BASEL, SWITZERLAND

DYESTUFFS CONTAINING CELLULOSE RESIDUES AND PROCESS OF MAKING SAME

No Drawing. Application filed February 17, 1931, Serial No. 516,502, and in Switzerland February 21, 1930.

This invention relates to the production of new dyestuffs containing cellulose residues and comprises the process of making these dyestuffs, as well as the new dyestuffs themselves.

In the copending application Ser. No. 422,950 it is shown that by acting upon cellulose which has been brought into a reactive form, for example upon alkali cellulose with such heterocyclic compounds as contain one or more

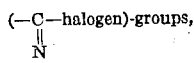

inter alia, for example, cyanuric halides, such as

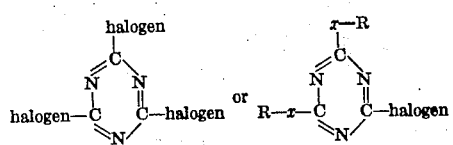

wherein $x$ stands for S, O, NH, and R for H, alkyl, aralkyl, or aryl,
dichloroquinazoline of the formula

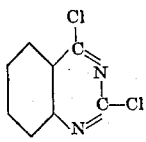

dichlorophthalazine of the formula

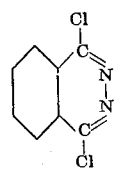

dihalide of maleic acid-hydrazides of the general formula

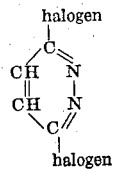

tribromopyrimidine of the formula

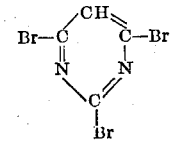

tetrachlorpyrimidine of the formula

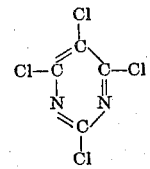

or the like, new cellulose derivatives are obtained which are characterized by their dyeing properties, in particular by their insensitiveness towards a series of cotton dyestuffs, such as direct dyestuffs, sulfurized dyestuffs, and vat-dyestuffs.

The new products are characterized by the following atom grouping

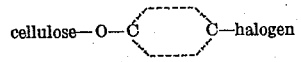

wherein the two carbon atoms belong to a six membered heterocyclic ring consisting of carbon and nitrogen atoms, and wherein at least two and not more than three nitrogen atoms are present.

In developing the invention described in the copending application Ser. No. 422,950 it has been found that further new cellulose derivatives may be obtained from the primary condensation products of the said specification, which still contain reactive halogen atoms, which new compounds retain their insensitiveness to cotton dyestuffs, and are suitable as intermediate products for the further manufacture of dyestuffs or are themselves dyestuffs. They are made by reaction between a primary condensation product containing at least one reactive halogen atom prepared from cellulose and a heterocyclic compound having at least once the atom-group

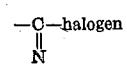

with a compound which contains on the one hand at least one hydrogen atom capable of being exchanged or an equivalent atom, and on the other hand at least one chromophor or one group capable of forming a dyestuff or a residue capable of being converted into such a group. Such compounds are, among others, dyestuffs of the various series containing amino-groups, such as nitro-dyestuffs, azo-dyestuffs, including thiazole dyestuffs, azoxy-stilbene-dyestuffs and pyrazolone or hydrazone dyestuffs, di- and tri-arylmethane dyestuffs, acridine-, oxyazine-, thiazine- and azine-dyestuffs, indigoids, aminoanthraquinones, aminoanthraquinone-dyestuffs, aromatic diamines, aminophenols, aminonaphthols and N- and O-acidyl or alkyl, aralkyl or aryl-derivatives of these, nitramines, nitrophenols, thiophenols, aminomercaptans or the like. There are produced colored cellulose derivatives or products which can be converted into dyestuffs or colored cellulose derivatives by diazotizing and coupling, by coupling with diazo-compounds, by condensation or by any other suitable operation. There can also be obtained products which are changed into complexes containing dyestuff groups according to the above procedure only after they have been subjected to a preliminary treatment, such as reduction of a nitro-group, saponification of an N- or O-acidyl-group or the like.

Similar products are obtained by first causing to react one halogen atom in the heterocyclic halogenides containing at least twice the grouping (—C—halogen)
‖
N such as, for example, cyanuric chloride, on compounds containing on the one part at least one exchangeable hydrogen atom or an equivalent atom, and on the other part at least one chromophor or a group capable of forming a dyestuff, or a residue which can be converted into such a group, then by bringing into reaction the products thus obtained with alkali cellulose in similar manner as is the case when cyanuric chloride is directly used, and finally by converting the products thus formed into bodies containing chromophor and auxochrome-groups by suitable further treatments, such as reduction, diazotization, coupling, etc.

The products thus obtained containing chromophor-groups and auxochrome-groups may be further treated, for instance for the purpose of improving their properties of fastness or changing the colour tint, the treatment consisting in a reduction, condensation, acidylation, alkylation, after-treatment with agents that yield metals, such as with compounds of chromium, copper, iron, manganese, nickel, cobalt, titanium, molybdenum or the like, coupling with diazo-compounds, diazotizing and coupling with coupling components or the like, or with any combination of two or more of these operations.

The new products are useful in the textile industry and are particularly valuable in the production of colored effects in mixed fabrics. Those which contain the chromophor group and thus are colored, are particularly valuable. They correspond with the general formula

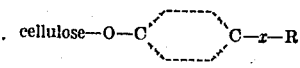

wherein $x$ stands for NH, S, or O, as connecting members, and R for a system consisting of at least one aromatic nucleus and at least one chromophor and at least one auxochrome. Among these numerous products, those are particularly valuable which are distinguished by their easy accessibility, i. e. wherein the cyanuric ring stands for the heterocyclic ring and $x$ means NH.

As chromophor the azo-group is first of all coming into consideration, and as auxochrome the $NR_1R_2$-group ($R_1$ and $R_2$ standing for hydrogen, alkyl, aralkyl or aryl), or the OH-group; moreover further chromophors are the anthraquinone group

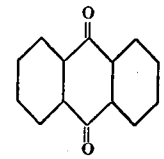

the triarylmethane chromophor

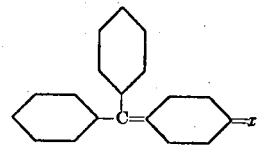

($x$ standing for O or =N-R, and R for H, alkyl, aralkyl or aryl), the thiazine chromophor

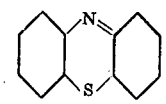

the azine chromophor

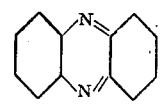

etc., whereby, by the presence of the auxochromes already mentioned, all the chromophors have dyestuff character.

The following examples illustrate the invention, the parts being by weight:—

*Example 1*

100 parts of cotton yarn are impregnated with a solution made by mixing 600 parts of caustic soda solution of 38 per cent. strength with 600 parts of alcohol of 95 per cent. strength and 300 parts of water for 40 minutes; the yarn is then centrifuged until its weight is only 2½ to 3 times that of the original yarn and is then treated in a solution of 50 parts of cyanuric chloride in 1500 parts of xylene having a temperature of 10° C. for 1-1½ hours. In the course of this time the temperature rises gradually to 30° C. The yarn is then thoroughly rinsed in hot and cold water and dried. The fiber contains nitrogen and chlorine. A similar result is obtained if instead of cyanuric chloride other heterocyclic compounds, such as dichloroquinazoline, tetrachloropyrimidine, or the like, are used.

*Example 2*

10 parts of para-diaminodiphenylmethane are dissolved in a mixture of equal parts of alcohol and water and the solution is filtered if necessary and is used for treating cotton prepared in the manner described in Example 1, for 24 hours at the ordinary temperature or at a raised temperature. After thorough rinsing in alcohol and hot water the fibers are diazotized in the usual manner, rinsed for a short time in cold water and developed in an alkaline solution of β-naphthol. The fiber contains an azo-dyestuff of which the formula may partially be represented as follows

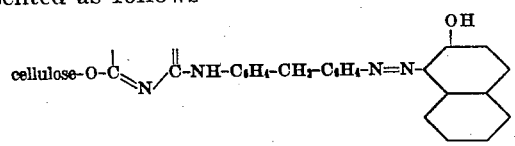

whereby the carbon atoms of the grouping

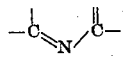

belong to a cyanuric ring. There is produced a vivid, somewhat yellowish red fast to washing.

Instead of para-diaminodiphenylmethane, other bodies may be used, such as dianisidine, and instead of β-naphthol other naphthols or any coupling component may be used; thus various results may be obtained in respect of the tint and properties of fastness.

*Example 3*

The cyanurated yarn obtained as described in Example 1 is soaked for a long time in a solution of 1 per cent. strength of the disodium salt of 1-amino-8-hydroxynaphthalene-3:6-disulfonic acid. After thorough rinsing in hot water the material is treated with a diazo solution prepared according to known prescription, whereby according to the diazo-compound selected various results may be obtained. Diazo-para-nitro-benzene, for example, yields a dark brick red, whereas diazo-meta-xylene produces a vivid red of very good fastness to washing. In the latter case the fiber contains an azo-dyestuff of which the formula may partially be represented as follows:

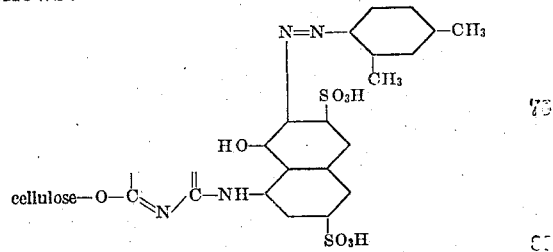

whereby the carbon atoms of the grouping

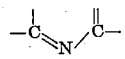

belong to a cyanuric ring. Instead of 1-amino-8-hydroxynaphthalene-3:6-disulfonic acid other amino-naphthols can be used or other naphthalene derivatives, for example 1-amino-8-hydroxynaphthalene-4:6- or 2:4-disulfonic acid, 1-amino-8-hydroxynaphthalene-4- or 5- or 6-monosulfonic acid, 2-amino-5- or 8-hydroxynaphthalene-7- or 6-monosulfonic acid, 1-amino-5-hydroxynaphthalene-7-sulfonic acid, 1:4-naphthalene-diamine or its 5- or 6-sulphonic acid, 1-amino-5- or 7- or 8-hydroxynaphthalene, etc. Instead of para-nitrodiazobenzene or diazo-xylene there may be used other diazo-compounds, such as aniline, toluidines, chloranilines and their homologues, anisidines or phenetidines and their mono- and poly-halogen derivatives, naphthylamines, or sulfonic acids or carboxylic acids of any of these compounds.

*Example 4*

The yarn, obtained as described in Example 1, is treated for some time, for instance for 24 hours, at ordinary or raised temperature in an aqueous solution of the sodium salt of 1-amino-8-hydroxynaphthalene-4-sulfonic acid and then thoroughly rinsed in hot water. The material is then treated with a solution of diazotized anthranilic acid, whereby a brown azo-dyestuff is produced on the fiber. The fiber contains an azo-dyestuff of which the formula may partially be represented as follows

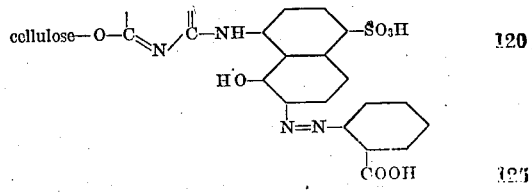

whereby the carbon atoms of the grouping

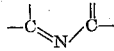

belong to a cyanuric ring. By after-treatment with copper sulfate and acetic acid or with copper sulfate, potassium bichromate and acetic acid, the color passes to a dark Bordeaux. Instead of anthranilic acid other diazo-components may be used, such as sulfoanthranilic acid, 4-chloro-2-aminophenol, similar effects being obtained. Instead of 1-amino-8-hydroxynaphthalene-4-sulfonic acid, there may be used the other amino-naphthols named in the foregoing examples; also diazo-components, such as ortho-amino-phenol, chloro- and poly-chloro-amino-phenols, 4- or 5- or 6-nitroaminophenols or its halogen or sulfonic acid derivatives, picramic acid, 1-amino-2-hydroxy- or 2-amino-1-hydroxy-naphthalene sulfonic acid or the like. In all these cases, the after-treatment with agents yielding metals is recommended and coupling may be carried out in presence of an agent which yields metal.

*Example 5*

The yarn prepared as described in Example 1 can be caused to react directly with an azo-dyestuff, by treating for example the prepared yarn for a long time in an aqueous solution of the azo-dyestuff obtained from diazoxylene and 2-(meta-amino-benzoyl)-amino-5-hydroxynaphthalene-7-sulfonic acid. The yarn, which is immune to most direct dyeing azo-dyestuffs, is dyed intensively red. The fiber contains an azo-dyestuff of which the formula may partially be represented as follows

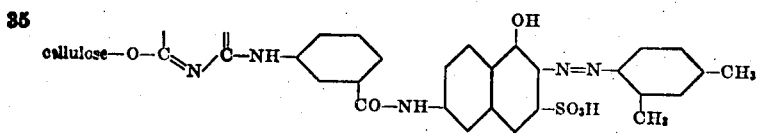

whereby the carbon atoms of the grouping

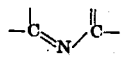

belong to a cyanuric ring. Orange tints are obtained by using the azo-dyestuff from the reduced dyestuff from 1 molecular proportion of tetrazotized meta-aminobenzoyl-meta-phenylene-diamine and 1-(3'-nitro)-phenyl-5-pyrazolone-3-carboxylic acid. In this case the formula can partially be represented as follows:

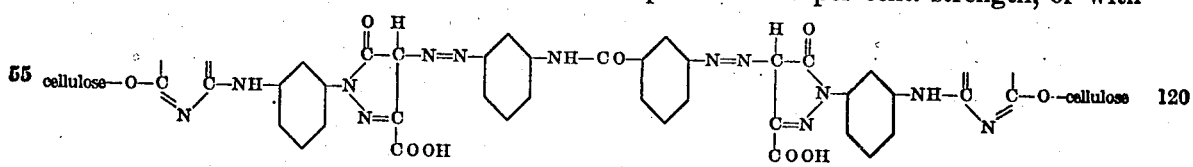

*Example 6*

The yarn prepared as described in Example 1 is caused to react in aqueous solution or suspension with para-nitraniline. After 24 hours the yarn is thoroughly rinsed, the nitro-group is reduced with sodium hydrosulfide solution, the amino-group thus formed is diazotized and coupling with β-naphthol follows. The fiber contains an azo-dyestuff of which the formula may partially be represented as follows:

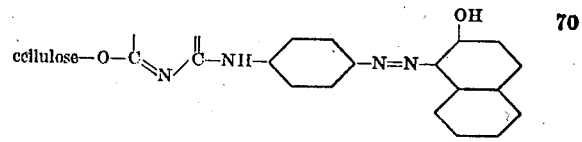

whereby the carbon atoms of the grouping

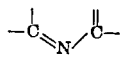

belong to a cyanuric ring. The yarn is dyed intense red. For the β-naphthol there can obviously be substituted another naphthol or phenol, or an unsulfonated coupling component, such as, for example, 2:3-hydroxynaphthoic acid or an arylide thereof, aminonaphthols and their sulfonic acids or the like.

Similar results are obtained when from the first diamines are used, such as meta- or para-phenylenediamine or their sulfonic or carboxylic acids, or even the naphthalene diamines named in Example 3 or their isomerides. When a mono-acidyldiamine is used, the acyl-group must be split off by saponification by means of acid or alkali before the coupling.

*Example 7*

10 parts of cyanuric chloride are dissolved in acetone and then entered into a mixture of water, ice and 15 parts of para-nitraniline. The yellow product is filtered after about 24 hours, first washed with water containing hydrochloric acid, then with pure water, and finally dried. Thereupon it is treated in 200-300 parts of xylene with alkali cellulose at the temperature of the boiling water-bath for 1 to 3 hours. The alkali cellulose used is obtained by impregnating 10 parts of cellulose, either with an alcoholic solution of caustic potash of 10 per cent. strength, or with an aqueous solution of caustic soda of 18 per cent. strength, or with a mixture of one part of caustic soda solution of 33 per cent. strength, 1 part of alcohol and ¼ part of water. The cotton dyed yellow-orange tints is reduced after rinsing in a warm solution of sodium hydrosulfite, whereby the orange coloration disappears. The material is then diazotized as usual and coupled with β-naphthol, intense red shades being thus produced. The fiber contains an azo-dyestuff of which the formula corresponds most probably to that indicated in Example 6. Instead of β-naphthol all other suitable coupling components may be employed, such as α-naphthol, resorcinol, toluylenediamine, etc.

*Example 8*

Yarn prepared as described in Example 1 with cyanuric chloride or tetrachloropyrimidine or the like is treated for a long time in an aqueous solution of para-rosaniline and then rinsed with hot water. The yarn is dyed an intense red fast to water.

What we claim is:—

1. A process for the manufacture of colored compounds which contain residues of cellulose and residues of azo-dyestuffs of the benzene and naphthalene series, connected by a six membered carbon and nitrogen containing heterocyclic residue, which contains at least two and at most three nitrogen atoms, consisting in causing to react compounds of the general formula

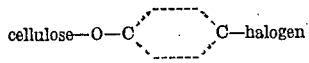

wherein both of the carbon atoms belong to a six membered carbon and nitrogen containing heterocyclic ring which contains at least two and at most three nitrogen atoms, on compounds of the benzene and naphthalene series which contain besides one primary amino group at least one OH-group or one amino group capable of forming azo-dyestuffs, and then in converting the condensation products thus obtained into azo-dyestuffs by diazotizing and coupling with coupling components.

2. A process for the manufacture of colored compounds which contain residues of cellulose and residues of azo-dyestuffs of the benzene and naphthalene series, connected by a cyanuric ring, consisting in causing to react compounds of the general formula

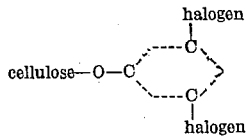

wherein the three carbon atoms belong to a cyanuric ring, on compounds of the benzene and naphthalene series which contain besides one primary amino group at least one OH-group or one amino group capable of forming azo-dyestuffs, and then in converting the condensation products thus obtained into azo-dyestuffs by diazotizing and coupling with coupling components.

3. A process for the manufacture of colored compounds which contain residues of cellulose and residues of azo-dyestuffs of the benzene and naphthalene series, connected by a six membered carbon and nitrogen containing heterocyclic residue, which contains at least two and at most three nitrogen atoms, consisting in causing to react compounds of the general formula

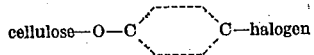

wherein both of the carbon atoms belong to a six membered carbon and nitrogen containing heterocyclic ring which contains at least two and at most three nitrogen atoms, on primary aromatic diamines of the benzene and naphthalene series, and then in converting the products thus obtained into azo-dyestuffs by diazotization and uniting with products which couple with diazo compounds.

4. A process for the manufacture of colored compounds which contain residues of cellulose and residues of azo-dyestuffs of the benzene and naphthalene series, connected by a cyanuric ring, consisting in causing to react compounds of the general formula

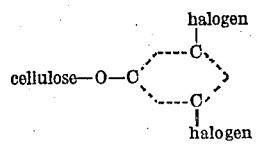

wherein the three carbon atoms belong to a cyanuric ring, on primary aromatic diamines of the benzene and naphthalene series, and then in converting the products thus obtained into azo-dyestuffs by diazotization and uniting with products which couple with diazo compounds.

5. As new products the colored cellulose derivatives, consisting of a cellulose residue connected by a six membered heterocyclic ring which contains at least two and at most three nitrogen atoms, with an aromatic system consisting of at least one aromatic ring of the benzene and naphthalene series, at least one chromophor and at least one auxochrome.

6. As new products the colored cellulose derivatives containing the cellulose residue, a six membered carbon and nitrogen containing heterocyclic ring and a residue of a dyestuff, the constitution of which may partially be represented by the following formulation

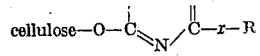

wheren the grouping

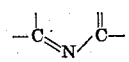

belongs to a six membered carbon and nitrogen containing heterocyclic ring which contains at least two and at most three nitrogen atoms, and wherein $x$ stands for NH, S, or O and R for a system consisting of at least one aromatic nucleus of the benzene and naphthalene series, at least one chromophor and at least one auxochrome.

7. As new products the colored cellulose derivatives containing the cellulose residue, a six membered carbon and nitrogen containing heterocyclic ring and a residue of a dyestuff, the constitution of which may partially be represented by the following formulation

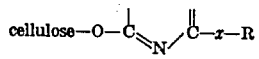

wherein the heterocyclic grouping

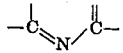

stands for a cyanuric ring, $x$ for NH, S or O and R for a system consisting of at least one aromatic nucleus of the benzene and naphthalene series, at least one chromophor and at least one auxochrome.

8. As new products the colored cellulose derivatives which contain simultaneously a cellulose residue, a cyanuric ring and a residue of an azo-dyestuff of the benzene and naphthalene series the constitution of which may partially be represented by the following formulation

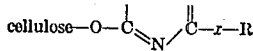

wherein the grouping

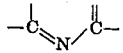

belongs to a cyanuric ring, $x$ stands for NH, S or O, and R for the residue of an azo-dyestuff.

9. As new products the colored cellulose derivatives which contain simultaneously a cellulose residue, a cyanuric ring and a residue of an azo-dyestuff of the benzene and naphthalene series the constitution of which may partially be represented by the following formulation

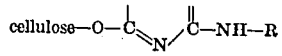

wherein the grouping

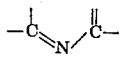

belongs to a cyanuric ring, and R stands for the residue of an amino-azo-dyestuff.

10. As new products the colored cellulose derivatives which contain simultaneously a cellulose residue, a cyanuric ring and a residue of an azo-dyestuff of the benzene and naphthalene series the constitution of which may partially be represented by the following formulation

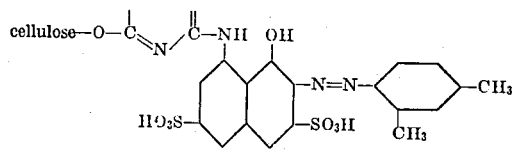

wherein the grouping

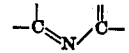

belongs to a cyanuric ring.

In witness whereof we have hereunto signed our names this 5th day of February, 1931.
ROBERT HALLER.
ALPHONSE HECKENDORN.